United States Patent [19]

Agger

[11] Patent Number: 5,250,656
[45] Date of Patent: Oct. 5, 1993

[54] HIGH MOLECULAR WEIGHT POLYMETHYLENE ADIPATES

[75] Inventor: Reginald T. Agger, Leicester, Great Britain

[73] Assignee: Bostik, Inc., Middleton, Mass.

[21] Appl. No.: 830,412

[22] Filed: Feb. 4, 1992

[30] Foreign Application Priority Data

Feb. 12, 1991 [GB] United Kingdom ............... 9102950

[51] Int. Cl.$^5$ .............................................. C08G 63/82
[52] U.S. Cl. ................................... 528/279; 528/272; 528/277; 525/437; 525/444
[58] Field of Search .................. 528/272, 277, 279; 525/437, 444

[56] References Cited

U.S. PATENT DOCUMENTS

| | | | |
|---|---|---|---|
| 4,128,535 | 12/1978 | Baker | 528/272 |
| 4,267,310 | 5/1981 | Landoll | 524/431 |
| 4,326,509 | 4/1982 | Usukura | 128/90 |
| 4,751,952 | 6/1988 | Imai | 152/527 |
| 5,089,344 | 2/1992 | Tamazaki et al. | 428/425.9 |

FOREIGN PATENT DOCUMENTS

| | | |
|---|---|---|
| 0323700 | 7/1989 | European Pat. Off. |
| 0448079 | 9/1991 | European Pat. Off. |
| 860034449 | 8/1986 | Japan. |
| 063158215 | 7/1988 | Japan. |
| 063251424 | 10/1988 | Japan. |
| 880065204 | 12/1988 | Japan. |

OTHER PUBLICATIONS

Kirk–Othmer, *Encyclopedia of Chemical Technology*, vol. 18, 3rd Ed. pp. 748–749.

*Primary Examiner*—Samuel A. Acquah
*Attorney, Agent, or Firm*—David G. Conlin; Peter F. Corless; Gregory D. Williams

[57] ABSTRACT

High molecular weight polymethylene adipates useful as melt adhesives and sealants, including adipates with molecular weights in excess of 30,000 are disclosed. Also provided is a process for preparing high molecular weight polymethylene adipates by polymerization of an acid and one or more diols with a minute molar excess of diol with respect to acid.

18 Claims, No Drawings

HIGH MOLECULAR WEIGHT POLYMETHYLENE ADIPATES

This invention relates to high molecular weight synthetic resin materials comprising polymethylene adipates which are tough, heat-formable and useful, for example, as stiffening materials.

Such materials are in demand, for example, as adhesives, sealants, moulding compounds and as stiffening materials for use in composite materials.

It is preferred that such materials should be tough, i.e. resilient, flexible and non-cracking and preferably self-supporting. Such materials are particularly suitable where resilience must be retained after adhesive bonding.

Materials of this type have been produced using a polycaprolactone having an estimated molecular weight of 50,000.

For many applications, temperatures above 100° C. are to be avoided because of likely damage to substrate materials. Generally, temperatures in the range 60° C. to about 100° C. are employed. Thus, the requirement of such materials is that they should have a relatively low melting point associated with a high degree of stiffness or crystallinity in order to achieve the required toughness. One way in which this has previously been achieved is by increasing molecular weight, but this involves a corresponding increase in viscosity.

Generally, most known materials, other than polycaprolactones as mentioned above, do not exhibit the desired combination of properties.

EP-A-0323700 discloses the production and use of tough, heat-formable, sheet materials and mouldable articles made therefrom comprising a highly crystalline polyesterurethane formed by reacting polyester chains of relatively low molecular weight with isocyanate. Nevertheless, such materials are subject to the usual objections against the use of isocyanates, in particular they may considered hazardous, they can be subject to discolouration and there may be a risk of harmful biproducts being produced if burnt.

EP-A-448079 is concerned with an alternative polyester material having the required combination of toughness with a relatively low melting point, but without the need for urethane extension reaction with isocyanate, comprising a polyhexamethylene adipate, with a molecular weight of at least 10,000 and a viscosity at 100° C. of at least 300 poise. This material exhibits the required stiffness and crystallisation time and is known to be useful in shoe stiffeners for example.

However, there is a need to vary these properties for certain applications, for example to lower the softening point still further whilst maintaining a tough stiff crystallising product, or to vary the time required for crystallisation, and for practical purposes in the production of such product to replace the use of the solid diol with one which is liquid at ambient temperatures.

The present invention arises from the surprising discovery that under carefully controlled conditions, it is possible successfully to react butane diol and/or pentanediol with adipic acid to produce a high molecular weight polymethylene adipate. This was not previously considered feasible because of the well known degradation of 1:4 butane diol to tetrahydrofuran. However, contrary to such indications we have discovered that under carefully controlled conditions, polymerisation can proceed to a molecular weight $M_n$, in excess of 10,000 and even in excess of 30,000.

According to the present invention we provide a tough, heat-formable synthetic resin material comprising polytetramethylene adipate and/or polypentamethylene adipate and possibly polyhexamethylene adipate with a molecular weight $M_n$ of at least about 10,000, and even greater than 30,000. Accordingly copolymers such as poly (tetramethylene-co-pentamethyleneadipate), polytetramethylene/hexamethylene adipate and poly (pentamethylene-co-hexamethylene adipate) are also embraced within the scope of the present invention.

Such high molecular weight polymethylene adipates are produced, in accordance with a further aspect of the invention, by reacting butane diol and/or pentanediol and possibly hexanediol with adipic acid in the presence of an effective amount of a catalyst, with a minute excess of diol with respect to adipic acid, i.e. preferably a diol/acid molar ratio in the range of about 1.001 to 1.03 and more preferably about 1.01.

When a mixture of hexanediol and butanediol and/or pentanediol is used, the amount of hexanediol in the mixture should be no more than 90% by mole. A still further feature of the invention is that the acid value of the polymeric material can be reduced, after the main reaction, by a further reaction with diol in such a quantity that only one of hydroxyl groups react with the residual acid groups, and this provides improved resistance to hydrolysis.

The polymethylene adipate materials according to the present invention exhibit softening points generally ranging between about 65° and 80° C.—i.e. lower than those of the corresponding polycaprolactones—and desired stiffness and crystallinity properties which make them particularly useful as melt adhesives.

By tight control of the reaction conditions, using the above-specified diol/diacid ratio and preferably also low levels of catalyst (i.e. preferably not exceeding about 600 ppm with respect to the diol) and temperatures not substantially exceeding about 230° C., it is possible to produce polymethylene adipates of exceptionally high molecular weight $M_n$, namely in excess of about 10,000 and up to about 60,000. Suitable catalysts include conventional esterification catalysts such as, for example, alkyl titanates and vanadates.

The reaction is carried out in reflux reactor under an inert atmosphere, particularly nitrogen, and after the temperature of the distillation column drops when most of the water has distilled off, the pressure is slowly reduced and then maintained at a lower pressure (about half an atmosphere) for an initial phase of the reaction. Then further catalyst is added and the reaction completed under a very low pressure.

In accordance with a further aspect of the present invention, there are provided melt adhesives and sealants comprising a high molecular weight polymethylene adipate such as hereinbefore described.

The invention will now be described with reference to the following preferred Examples.

EXAMPLE 1

The following ingredients are reacted in a reflux reactor under nitrogen:

| | |
|---|---|
| Butane Diol | 36.117 kg |
| Adipic Acid | 58.008 kg |

-continued

| | |
|---|---|
| Tetrabutyl Titanate | 11 g |
| Dibutyl Tinoxide | 1.6 g |

The distillation column of the reflux reactor is maintained at a temperature not exceeding 100° C. When most of the water has distilled off from the reaction mixture, the column temperature drops and at that stage the pressure is reduced slowly to 0.5 bar over a period of approximately half an hour and the reaction is maintained for a further half hour at a temperature not exceeding 230° C. During this period, the major part of the condensation reaction occurs at very low catalyst levels. A further 12 g of tetrabutyl titanate is then added and the pressure reduced as low of practicable, for example to about 0.5 mbar. and the temperature again maintained not above 230° C. until the desired viscosity of the polymer is achieved, namely between 550 and 700 poise at 230° C. Nitrogen is then introduced to break the vacuum and the polytetramethylene adipate produced was found to have a viscosity corresponding to a molecular weight of approximately 37,000.

Various properties of this material are set out in the accompanying table.

EXAMPLE 2

The procedure in accordance with Example 1 was repeated using a mixture of butane diol and hexane diol in a molar ratio of 9:1. Properties of the resultant product are given in the accompanying table.

EXAMPLE 3

The procedure in accordance with Example 1 was repeated using a mixture of butane diol and hexane diol in a molar ratio of 7:3. Properties of the resultant product are given in the accompanying table.

EXAMPLE 4

The process of Example I was repeated, but instead of recovering the polytetramethylene adipate at the end of the second stage, a further 260 g of 1:4 butane diol were added whilst the vacuum was broken by nitrogen, and then pressure was again reduced to about 0.5 mbar over a period of about half an hour and polymerisation was continued under the same conditions until the same final viscosity was reached. Again the properties of this material are shown in the accompanying table.

For comparison purposes, it should be noted that a polycaprolactone material having a molecular weight of approximately 50,000 shows a softening point (ring and ball method) of 86° C.

TABLE

| Example | B/H | AV | SP | ST | D | EB | TS |
|---|---|---|---|---|---|---|---|
| 1 | 100:0 | 2.5 | 79 | 5 | 34 | 1000 | 3780 |
| 2 | 90:10 | | 74 | 7.9 | 42 | | |
| 3 | 70:30 | | 67 | 11.5 | 44 | | |
| 4 | 100:0 | 0.8 | | | | 850 | 3140 |

B/H: Mole ratio butane diol:hexane diol reacted at 1.01 molar with adipic acid to a viscosity of about 400 poise at 230° C. ex reactor.
AV: Acid value - mgs KOH/gram.
SP: Softening point - °C.; determined by ball and ring method.
ST: Setting time - mins; determined by heating/melting a sample of approx. 2 grams on a dark metal and then cooling at room temperature until a definite cloudiness is observed.
D: Droop - mm.; determined by forming a film 10 cm × 2 cm × 48 thou, holding such film at one end over 1 sq. cm and noting the furthest vertical droop over 10 mins to provide an indication of stiffness, rigidity and degree of crystallisation.
EB: Elongation at break - %
TS: Tensile strength - psi

I claim:

1. Polymethylene adipate having a molecular weight $M_n$ of at least about 30,000.

2. The polymethylene adipate of claim 1 where the polymethylene adipate is formed from reagents comprising adipic acid and one or more diols selected from the group consisting of butane diol, pentanediol and hexanediol.

3. The polymethylene adipate of claim 1 where the polymethylene adipate is formed from reagents comprising adipic acid and a mixture of diols consisting of hexanediol and one or more diols selected from the groups consisting of butane diol and pentanediol.

4. The polymethylene adipate of claim 3 where hexanediol is present in said mixture in an amount of about 90 mole percent or less of the total diols of said mixture.

5. The polymethylene adipate of claim 1 where the polymethylene adipate is formed from reagents consisting essentially of adipic acid and one or more diols selected from the group consisting of butane diol, pentanediol and hexanediol.

6. The polymethylene adipate of claim 1 where the polymethylene adipate is formed from reagents consisting essentially of adipic acid and one or more diols selected from the group consisting of butane diol and pentanediol.

7. The polyethylene adipate of claim 1 where the polyethylene adipate is selected from the group consisting of poly(tetramethylene-co-pentamethyleneadipate, polytetramethylene/hexamethylene adipate and poly(-pentamethylene-co-hexamethyene adipate) copolymers.

8. The polymethylene adipate of claim 1 where the polymethylene adipate is formed from reagents comprising adipic acid and one or more diols selected from the group consisting of butane diol, pentanediol and hexanediol, wherein the molar ratio of the diol to the acid is from about 1.001 to 1.03.

9. The polymethylene adipate of claim 8 where said molar ratio is about 1.01.

10. The polymethylene adipate of claim 1 where the polymethylene adipate has a molecular weight $M_n$ of between about 30,000 and 60,000.

11. The polymethylene adipate of claim 1 where the polymethylene adipate has a softening point of from about 65° C. to 80° C.

12. A melt adhesive or sealant comprising a polymethylene adipate having a molecular weight $M_n$ of at least about 30,000.

13. A process for producing a polymethylene adipate, comprising:
reacting adipic acid with one or more diols selected from the group consisting of butane diol, pentanediol and hexanediol in the presence of an effective amount of a catalyst to form a polymethylene adipate having a molecular weight, $M_n$ of at least 30,000 polymethylene adipate, and wherein the molar ratio of the diol to the acid is from about 1.001 to 1.03.

14. The process of claim 13 where said adipic acid and one or more diols are reacted to form a polymethylene adipate having a molecular weight $M_n$ of between about 30,000 and 60,000.

15. The process of claim 13 where the adipic acid and one or more diols are reacted at a temperature not exceeding about 230° C.

16. The process of claim 13 where after said reaction of the adipic acid and one or more diols the polymethylene adipate is further reacted with an amount of a diol whereby only one hydroxyl group of said diol reacts with acid groups of the polymethylene adipate.

17. The process of claim 13 where the catalyst is present in an amount not exceeding about 600 ppm with respect to the amount of said one or more diols.

18. The process of claim 13 where the catalyst is selected from the group consisting of alkyl titantes and vanadates.

* * * * *